INVENTORS
RICHARD S. GEWARTOWSKI
FRANK T. MAKOWSKI
JOSEPH L. DEIBEL
BY
ATTORNEYS

INVENTORS
RICHARD S. GEWARTOWSKI
FRANK T. MAKOWSKI
JOSEPH L. DEIBEL
BY
ATTORNEYS

:::info
3,483,739
Patented Dec. 16, 1969
:::

3,483,739
ULTRASONIC BILLET INSPECTION APPARATUS
Richard S. Gewartowski, Mount Prospect, Frank T. Makowski, Niles, and Joseph L. Deibel, Palatine, Ill., assignors to Magnaflux Corporation, Chicago, Ill., a corporation of Illinois
Filed June 30, 1965, Ser. No. 468,403
Int. Cl. G01n 9/24
U.S. Cl. 73—67.8                                                  9 Claims

ABSTRACT OF THE DISCLOSURE

Apparatus particularly designed for testing of square steel billets in which a pair of ultrasonic probes transmit and receive along axes normal to adjacent surfaces of a billet and intersecting at the center of the billet, the probes being preferably pulsed simultaneously and connected to a common amplifier. Important features relate to the support of each of the probes between a pair of wheels having cylindrical surfaces of hardened steel, the two pairs of wheels being supported on a longitudinally movable carriage in a manner to permit the wheels to follow twists and bends in a billet. Additional important features relate to the incorporation of the ultrasonic testing system in a unitary assembly including magnetic particle processing and inspection apparatus, with the results of the ultrasonic testing of each billet being recorded and then presented to an inspector as he inspects the magnetic particle indications of the same billet.

---

This invention relates to ultrasonic billet inspection apparatus and more particularly to apparatus designed for the inspection of large steel billets to detect cracks, voids or other flaws within the interior of the billet.

Systems have heretofore been proposed for the testing of billets by the magnetic particle method, wherein billets are shifted one by one in a side-wise direction from a receiving point to a processing position wherein they are magnetized with magnetic particles being applied, the billets being then shifted again in a side-wise direction to an inspection position. With such systems it has been possible to accurately determine the existence and location of defects which has been extremely valuable in that unsatisfactory billets can be rejected to avoid the waste of expensive machining or other operation thereon. However, the magnetic particle inspection method is limited with respect to the depth of defects which can be detected. In the case of steel billets, a common defect which cannot be detected by the magnetic particle method is "pipe" which is initially formed slag and inclusions in ingots and which may remain in the billet formed therefrom, usually in almost the exact center of the billet. In some circumstances, such defects are not serious but in others the presence of such defects may render it unfit for the desired end use.

It is known that ultrasonic testing can be used for the location of flaws deep within a metal part, and various scanning systems have been used. In one type of system, an immersion technique is used in which the part to be inspected is totally immersed in a liquid usually water, and in which a scanning probe is supported from a carriage for movement through the liquid along the part. In another type of system, the part is not immersed, but a stream of water is used to establish a water column between the probe and the part to serve as a couplant for the ultrasonic waves, the probe being supported from a carriage to move in a fixed scanning path along a part. In still another type of system, a rubber tire is engaged with a part and is at least partially filled with a liquid, a probe being located within the tire with sound waves being transmitted through the liquid and the tire into the part.

It is found that such systems are not satisfactory for the testing of steel billets or other elongated objects of similar characteristics. The immersion technique poses severe handling problems. With the water column technique, it has not been possible to maintain a uniform spacing between the probe and the part and also it has not been possible to maintain the required perpendicular relationship between the probe axis and the surface of the billet, particularly since the billets are not of uniform shape and usually are twisted, hooked, bent, bowed, or otherwise distorted. Similar difficulties have been encountered with the rubber tire system and in addition, the tire rapidly wears out or is cut up by scabs, slivers, fins and the like on the billet surfaces. All of the systems as heretofore proposed would involve the addition of considerable handling equipment and additional inspectors, and would impose additional difficulties in correlating the test results to determine whether or not a particular billet is satisfactory.

This invention was evolved with the object of overcoming the disadvantages of prior systems and of providing a satisfactory system for the testing of large steel billets. It will be understood, however, that many features of the invention are not limited to the testing of such billets but are generally applicable to the testing of elongated objects of various configurations including round, rectangular, square, flat and irregular cross-sections. Further, some of the features are not limited to ultrasonic testing, and unless otherwise limited it will be understood that references to ultrasonic testing, ultrasonic probes, etc. are intended to include equivalent types of testing or testing devices.

According to an important feature of this invention, ultrasonic probe means are supported on a carriage movable along an elongated object with wheel means on the carriage for fixing the position of the probe means relative to a surface portion of the object during scanning movement thereof. With this arrangement, the adverse effect of variations in contour of the object on the testing operation is minimized. This arrangement is thus particularly advantageous in testing of billets.

Another important feature of the invention is in the use of a pair of ultrasonic probe means connected to pulse-echo apparatus and supported by a carriage for transmission and reception of ultrasonic waves along axes intersecting in a region within the object and having a substantial angle therebetween. In the case of an object of rectangular or square cross-section, such as a billet, the axes may be at right angles to surfaces of the object and thus at right angles to each other. This feature is important in that it serves to insure detection of flaws regardless of their orientation within the object. Preferably, and in accordance with a specific feature of the invention, the probes are pulsed simultaneously and with certain orientations of flaws which might otherwise go undetected, reflections of the waves transmitted from one probe are received by the other and vice-versa.

A further important object of the invention is in the incorporation of the ultrasonic testing system in a unitary handling assembly which also includes magnetic particle processing and inspection, operable to test billets at the same rate as either apparatus operating alone, and occupying substantially the same space with a minimum of additional handling equipment. In accordance with this feature, a number of different sets of transfer arms are used for moving a billet side-wise through the assembly, first to an ultrasonic test position, then to a magnetic processing position and then to an inspection position. With the ultrasonic test position ahead of the magnetic processing position, the ultrasonic test apparatus cannot disturb magnetic indications.

A specific feature is in the provision of recording apparatus such that the results of the ultrasonic testing operation are available to the operator when he is making the inspection of the magnetic indications so that he can make a judgment as to whether the object should be passed, rejected or indicated as salvageable.

Another feature of the invention is in the use of wheels having rigid cylindrical surfaces, preferably of hardened steel, for engagement with the surfaces of the object. With this arrangement, a uniform spacing and angle between the probe and a surface of the object is maintained and the apparatus is not susceptible to damage by surface inperfections such as scabs, slivers, fins and the like.

Additional important features of the invention reside in the support of a carriage having wheels engageable with the object, for articulatory movement such as to accommodate variations in the positioning of the object. Bends or bows of the object are accommodated and in the case of rectangular billets or the like, the probe can be accurately positioned despite twists in the billet.

This invention contemplates other objects, features and advantages which will become more fully apparent from the following detailed description taken in conjunction with the accompanied drawings which illustrate a preferred embodiment and in which:

FIGURE 8 is a schematic diagram illustrating the electrical connection of components of the ultrasonic testing system.

Figure 1:
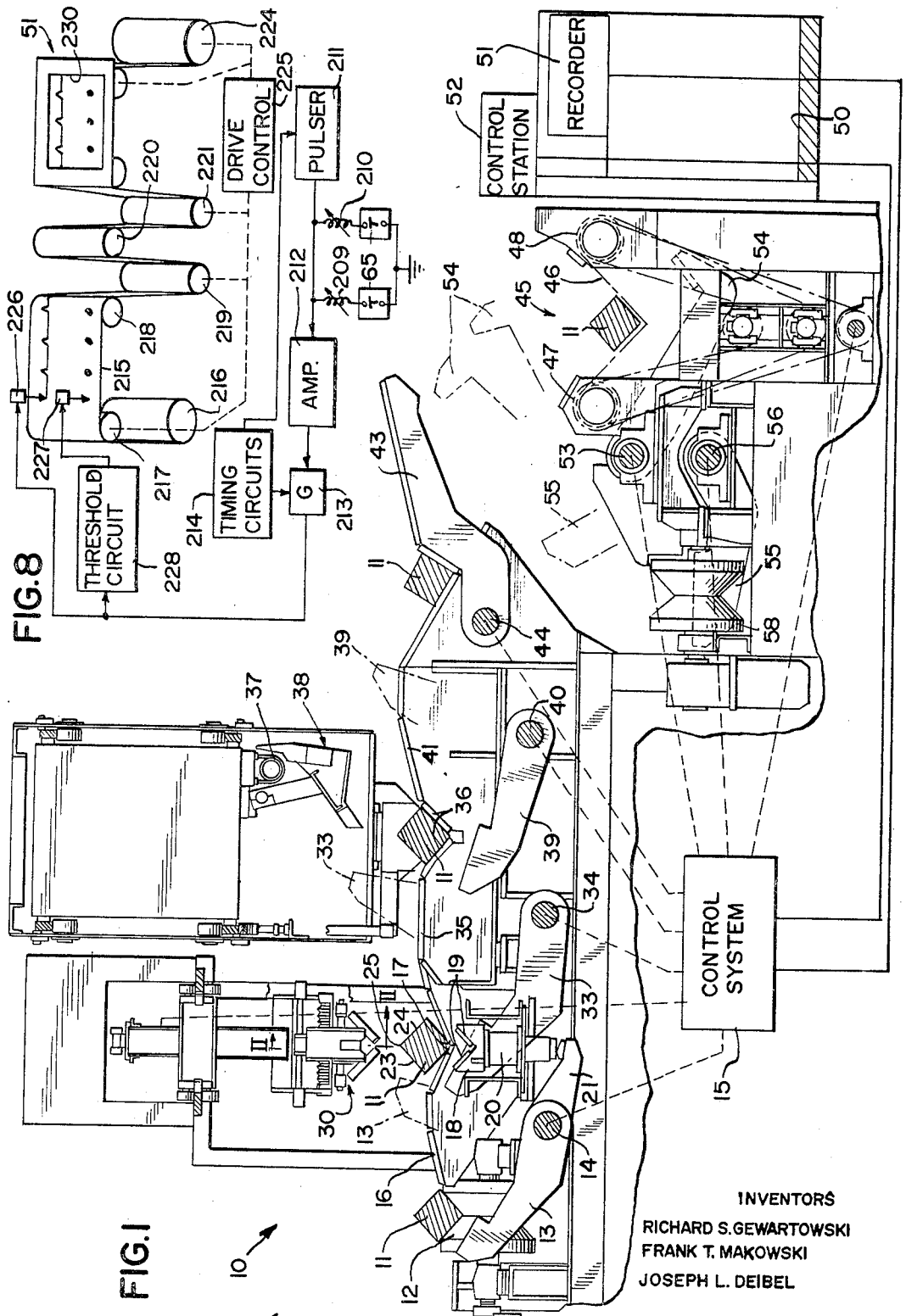
FIGURE 1 is an elevational cross-section, partly diagrammatic, of a system for ultrasonic testing and magnetic testing of steel billets or the like, constructed according to the principles of this invention.

Reference numeral 10 generally designates inspection apparatus constructed according to the principles of this invention. The apparatus 10 is particularly designed for the inspection of large steel billets of square cross-section but it will be understood that various principles of the invention may be applied to the inspection of other forms of elongated objects.

In the operation of the apparatus 10, a billet 11 is initially disposed on run-in rollers 12 which are driven to move the billet 11 axially until the end thereof engages a snubber element, not shown. The billet 11 then overlies the ends of a series of arms 13 which are affixed on a common horizontal shaft 14. The shaft 14 is then rotated by a control system 15 to move the arms 13 in a clockwise direction as viewed in FIGURE 1 and to lift and slide the billet 11 over skid rails 16 until the billet 11 is positioned in notches 17.

The billet then overlies a series of support and guide blocks 18 which have V-shaped notches with pads 19 therein and which are secured to the upper ends of pins 20 guided for vertical movement. Upon rotation of the shaft 14 in the reverse direction, arms 21 secured thereto engage the lower ends of the pins 20 to elevate the guide blocks and to hold the billet in a position in which two side surfaces 23 and 24 thereof face upwardly at opposite 45° inclinations to a vertical plane through an edge 25 at which the surfaces 23 and 24 meet.

When so positioned and held by the guide blocks 18, the billet is inspected ultrasonically by means of a pair of probes 27 and 28 on a carriage 30 which is carried from overhead support rails 31 and 32. The carriage 30 is automatically lowered to position the probes 27 and 28 adjacent the surfaces 23 and 24 of the billet, after which the carriage is moved along the billet with a continuous stream of water being applied between the probes 27 and 28 and the surfaces 23 and 24 to insure good acoustical coupling. Important features of the invention reside in the construction and operation of the ultrasonic scanning apparatus as described in detail hereinbelow.

After completion of the ultrasonic inspection, the carriage 30 is elevated and the shaft 14 is rotated in a clockwise direction to the position shown to lower the blocks 18 and to lower the billet into the notches 17. A series of arms 33 on a common shaft 34 are then rotated in a clockwise direction to lift and slide the billet from the notches 17 over skid rails 35 to a series of notches 36, the billet being then disposed in a magnetizing position. After return of the arms 33 to the illustrated position, arms 13 may be rotated in a clockwise direction to position another billet in notches 17.

At the magnetizing position a pair of contacts, not shown, are engaged with the ends of the billet and a magnetizing current is passed therethrough. During or after application of the current, a bath containing magnetic particles is applied from openings in a feed pipe 37 to flow over an applicator 38 onto the billet. The magnetic particles are attracted to and concentrated over regions of the billet having flaws therein, to permit a visual indication of the flaws.

After magnetizing of the billet and application of the bath, a series of eject arms 39 on a common shaft 40 are rotated in a clockwise direction to move the billet over skid rails 41 and against portions of a series of feed arms 43 on a common shaft 44. Thereafter, the feed arms 43 are rotated in a clockwise direction to allow the billet to slide down into a series of slings 45 defined by portions of continuous chains 46 trained between pairs of sprocket wheels 47 and 48.

The billet is then in an inspection position for viewing by an operator who may stand and walk along a platform 50. The operator may energize a motor operative to rotate the sprocket wheels 47 and 48 and thus rotate the billet to permit inspection of the entire peripheral surface thereof. At the same time, the operator may inspect a record of the ultrasonic test, produced by a pen recorder 51 or other type recorder or indicator located adjacent the platform. The operator then decides whether the billet should be rejected, passed or indicated as salvageable. After making his judgment, he then operates a control at a control station 52 to cause the control system to operate a shaft 53 and to rotate a series of discharge arms 54 thereon in a counter-clockwise direction, to lift the billet from the chain sling turners and to allow the billet to slide down arms 54 into engagement with receiving arms 55 on a common shaft 56. Shaft 56 is then rotated in a counter-clockwise direction to lower the billet onto a series of run-out rollers 58 which are driven to move the billet lengthwise out of the inspection apparatus. Arms 54 may be used to receive a billet from arms 43 and lower it into the chain sling turners, as well as for discharging the billet.

The control system operates the shafts 14, 34, 40, 44 in timed relation such that billets are transferred from one position to another through the apparatus such that one billet is inspected while a second billet is held on arms 43 awaiting inspection, a third billet is in the magnetizing position, a fourth billet is being inspected ultrasonically and a fifth billet is being fed into the apparatus. Thus, the billets may be moved through the apparatus at a rapid rate. By way of example, it is possible to operate on a 20 second cycle.

It should be noted that transfer arms of the general type as illustrated, and equivalent conveyor transfer means, as well as the control system for operating the same, the magnetizing and bath applicator apparatus, the chain-sling turners and the run-in and run-out rollers were all known prior to the present invention. The incorporation of the ultrasonic testing apparatus in the system, however, is an important feature of the invention. It permits the detection of defects in the central part of a billet which could not be detected by the magnetic testing apparatus. Thus, the billet may be completely inspected in a unitary handling assembly, operable at essentially the same rate of speed as a magnetic testing assembly operating alone. An important specific feature is that the ultrasonic testing position is ahead of the magnetizing and bath application position so that the water used as the couplant and the engagement of wheels of the ultrasonic testing apparatus with the billet cannot wash off or disturb the magnetic indications. At the same time, it is found that the prior application of the coupling water and the prior ultrasonic testing has no adverse effect on the magnetic testing operation. A further specific feature is that the result of the ultrasonic testing operation is available to the operator when he is inspecting the billet for defects indicated by the magnetic processing, so that he can make a complete and final judgment as to whether the billet is unsatisfactory, satisfactory or salvageable. Thus, considerable time is saved which is quite important since the operator must be trained and skilled.

Important features of the invention reside in the mounting of carriage 30 in a manner such as to maintain uniform spacings and angles between the ultrasonic probes 27 and 28 and the surfaces 23 and 24 of the billet, while accommodating twists, bends, bows and other distortions of the billet.

In general, the probes 27 and 28 are rigidly mounted on a frame forming the carriage 30, on which a pair of rear wheels 61 and 62 and a pair of front wheels 63 and 64 are journaled, with the carriage having limited freedom of movement about certain axes and in certain directions and being restricted from movement in other directions such as to permit variations in the positioning of the billet while maintaining a uniform spacing between the probes and the surfaces of the billet.

Figure 3:
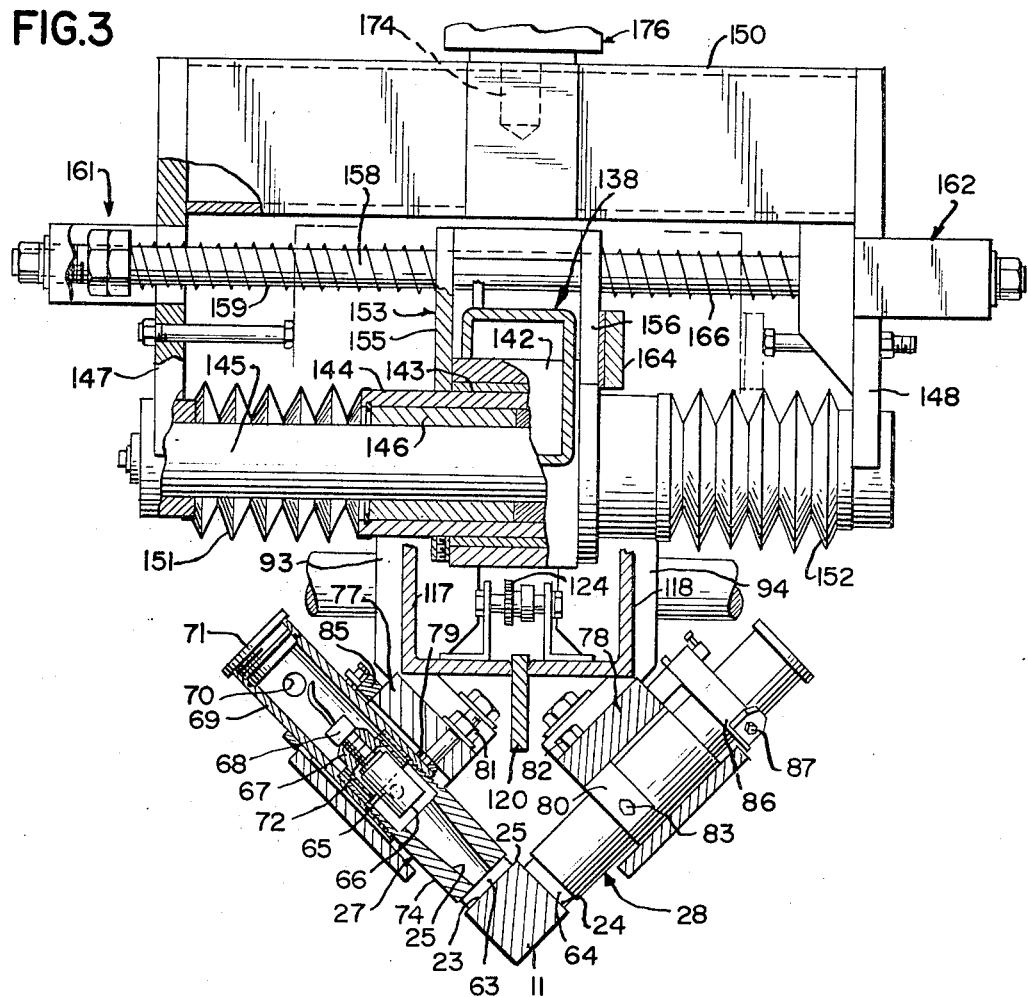
FIGURE 3 is a cross-sectional view taken substantially along line III—III of FIGURE 2.

Referring to FIGURE 3, the probe 27 comprises an ultrasonic transducer 65 having a construction known in the art. In general, a piezoelectric crystal is mounted within the transducer 65 adjacent an end face 66 thereof to emanate ultrasonic waves in response to a pulse of electrical current applied thereto and to thereafter "listen" for returning echoes and to convert such echoes into impulses which are amplified and indicated by a system as described hereinafter. The transducer 65 is mounted on a support member 67 by means of a screw 68, the support member 67 being secured within an outer sleeve 69.

To attain good acoustical coupling between the transducer 65 and the billet, a water column is established therebetween. In particular, water is supplied through a suitable hose into an opening 70 at the outer end of the sleeve 69, the sleeve 69 being closed by an end plug 71. The water flows through a plurality of axially extending passages 72 in the support member 67, surrounding the transducer 65 and into the inner end of a nozzle 74 threaded into the inner end of the sleeve 69, the nozzle 74 having a tapered inner surface 75 effective to provide resistance to water flow such as to insure that the region between the end face 66 of the transducer 65 and the surface 23 of the billet is completely filled with water, without air bubbles, so as to insure good acoustical coupling.

The probe 28 has a construction substantially identical to that of the probe 27. The probes 27 and 28 are supported on a pair of bars 77 and 78 extending longitudinally parallel to the axis of the billet 11. In particular, a pair of generally U-shaped brackets 79 and 80 are secured to the bars 77 and 78 by bolts 81 and 82 and carry screws 83 for engaging and holding opposite sides of the probes. In addition, brackets 85 and 86 are fixedly secured to the bars 77 and 78 and carry adjustment screws 87 and 88, spaced 120° from each other on the respective brackets. With this arrangement, the position of the probes can be accurately adjusted, which is important in that the probe axes, along with which the ultrasonic waves are transmitted and received, must be perpendicular to the surfaces of the billet, as near as possible.

Figure 4:
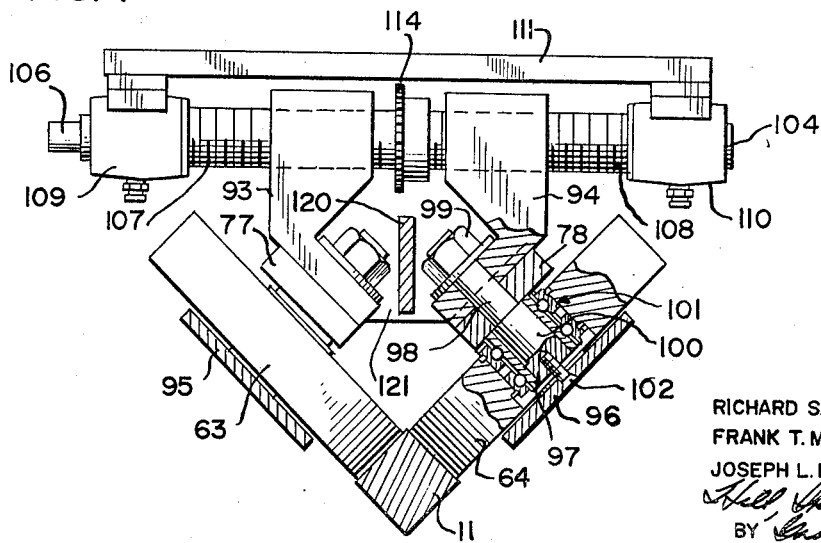
FIGURE 4 is another cross-sectional view taken substantially along line IV—IV of FIGURE 2.

For supporting the bars 77 and 78, the rearward ends thereof are secured to downwardly and inwardly extending portions of a pair of blocks 91 and 92, and the forward ends thereof are secured to downwardly and inwardly extending portions of a pair of blocks 93 and 94. For securing the ends of the bars 77 and 78 to the blocks 91–94, four bolt members are provided which also serve to rotatably support the wheels 61–62, and which additionally serve to support guard plates 95 and 96 extending along the sides of the carriage. One connection is shown in FIGURE 4, the other connection as being the same. As shown, a bolt member 97 has a reduced diameter portion 98 which extends through the bar 78 and through the downwardly and inwardly extending portion of the block 94, with a nut 99 threaded on the end of the portion 98 to hold the members in assembly. A larger diameter outer end portion 100 of the bolt member 97 journals the wheel 64 through a ball bearing assembly 101, while a screw 102 extends through the plate 96 and is threaded into the end of the bolt member 97, to support the guard plate 96.

In accordance with a specific feature of the invention, the blocks 91–94 are so supported as to permit simultaneous adjustment of the position of all four blocks relative to a central plane of the carriage. In particular, the rearward pair of blocks 91 and 92 and the forward pair of blocks 93 and 94 are respectively supported on two adjustment screw members 103 and 104 having squared ends 105 and 106 either of which may be engaged and rotated by a wrench to effect simultaneous adjustment of the positions of all four blocks. As shown in FIGURE 4, the adjustment screw member 104 has portions 107 and 108 with external threads of opposite sense thereon (i.e. left and right hand threads), engaged with internal threads in openings through the blocks 93 and 94. End portions of the member 104 are journaled in bearing members 109 and 110 carried from a plate 111. The rearward adjustment member 103 is the same as the member 104 and is carried from rearward plate 112.

To effect simultaneous movement of the front and rear adjustment members 103 and 104, sprocket wheels 113 and 114 are secured on central portions thereof and are connected through a chain 115.

The plates 111 and 112 form portions of a rigid frame structure of the carriage 30. In particular, the opposite sides of the plates 111 and 112 are welded or otherwise secured to the upper edges of generally L-shaped members 117 and 118 having horizontal legs, the inner ends of which are welded or otherwise secured to a longitudinally extending plate 120. The ends of the plate 120 are secured to a pair of vertical plates 121 and 122 the upper ends of which are welded or otherwise secured to the ends of the plates 111 and 112. It may be noted that the horizontal legs of the L-shaped members 117 and 118 support brackets which journal idler sprockets 124 engaged with the chain 115.

Figure 2:
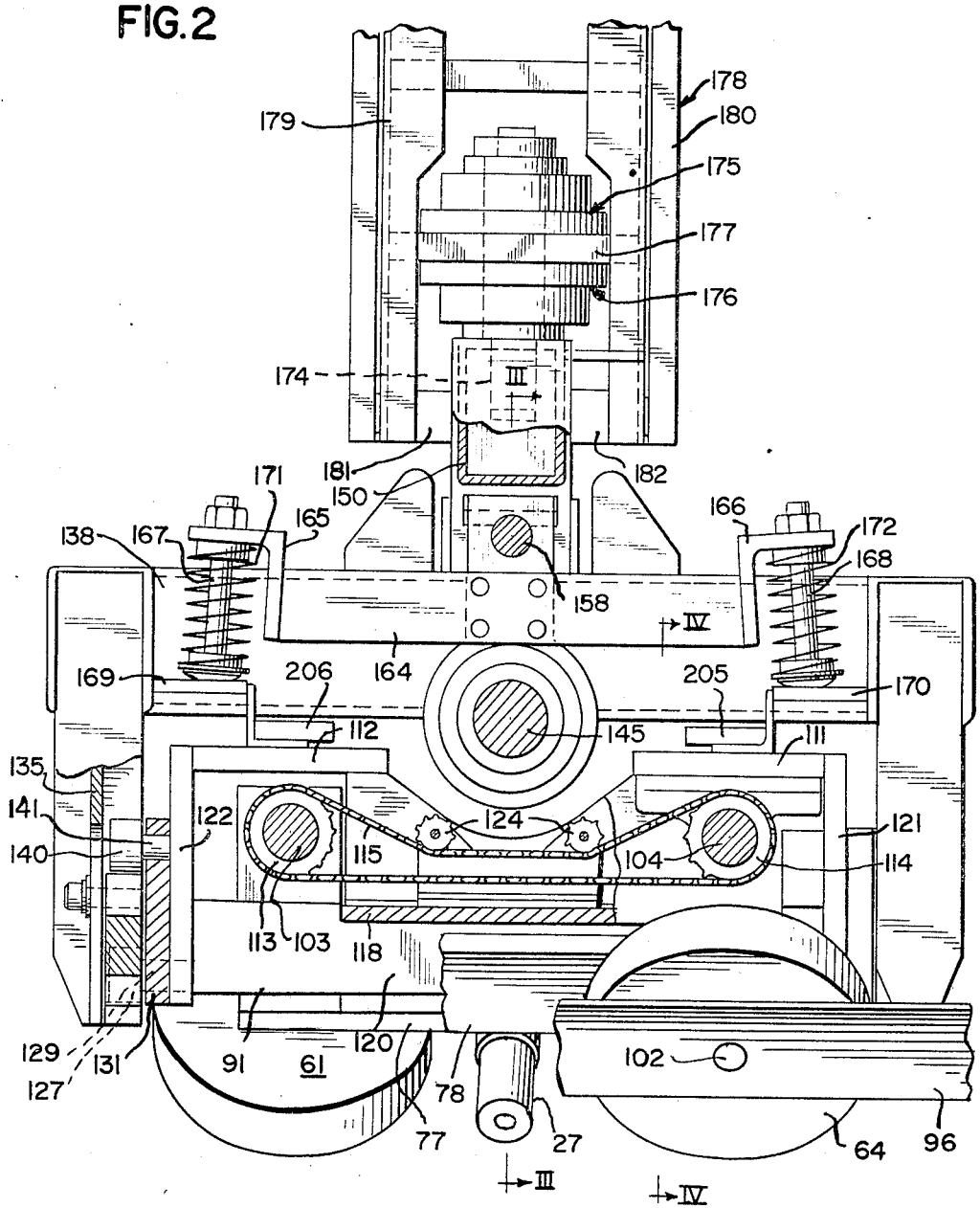
FIGURE 2 is an elevational sectional view, on an enlarged scale, taken substantially along line II—II of FIGURE 1, showing the construction of an ultrasonic carriage unit.
Figure 5:
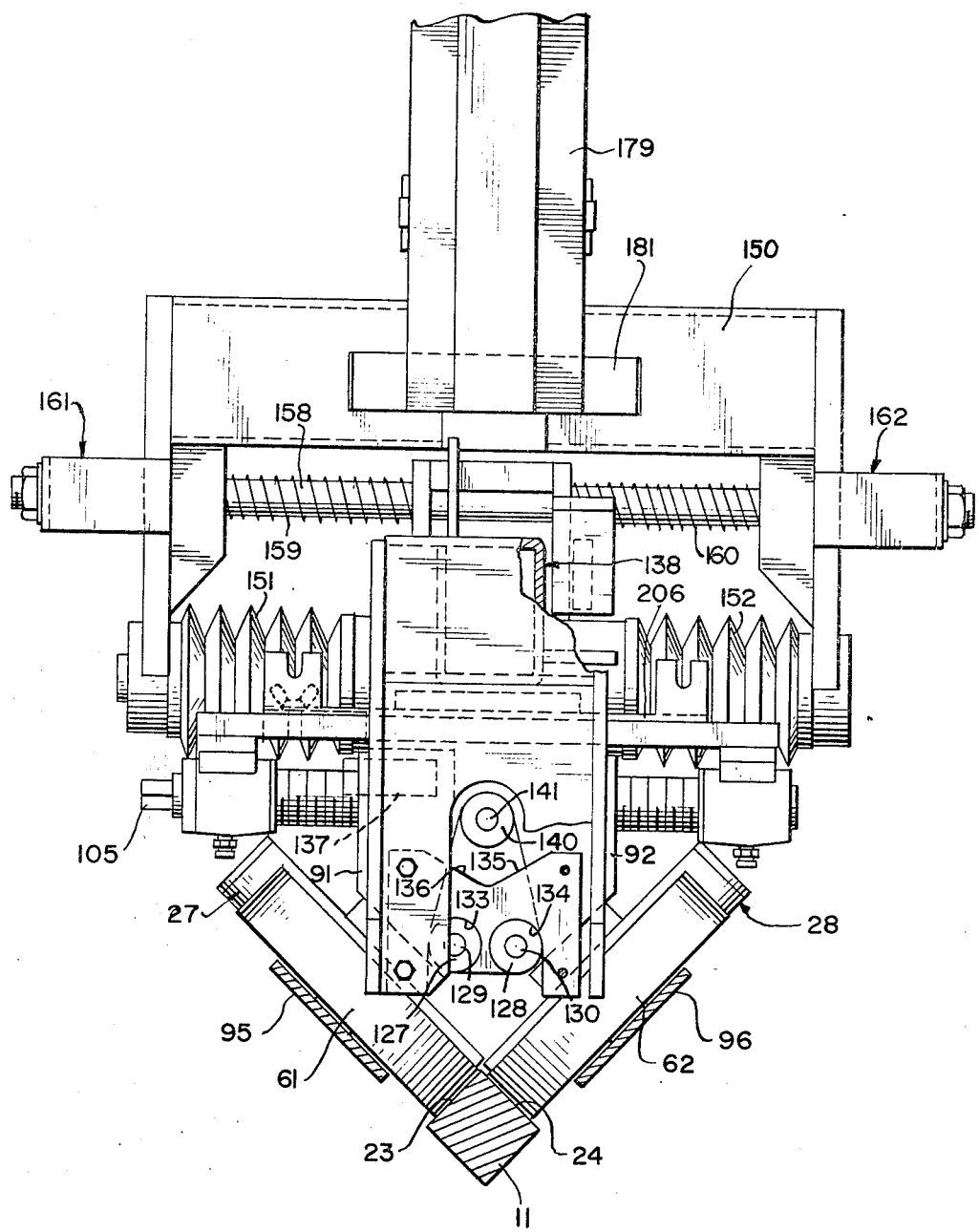
FIGURE 5 is a rearward elevational view of the ultrasonic carriage unit illustrated in FIGURES 2–4.
Figure 6:
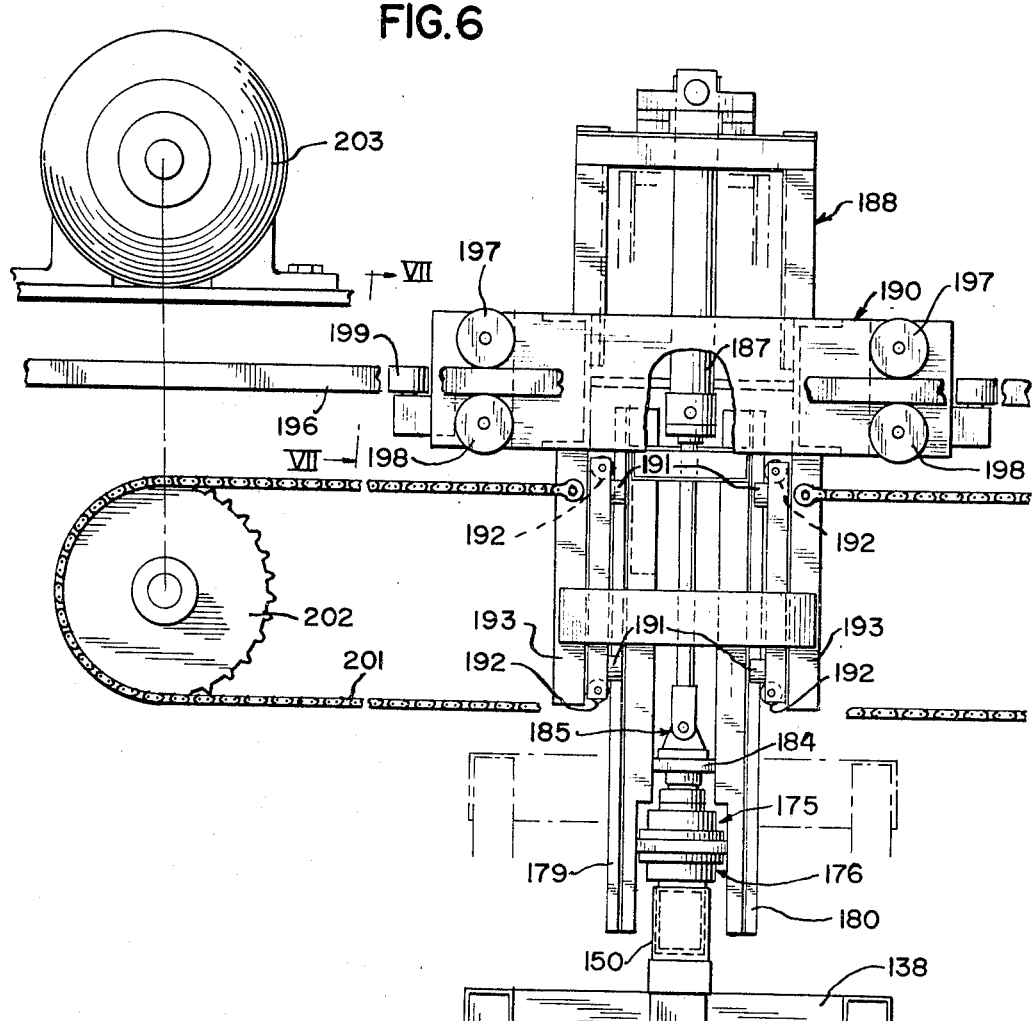
FIGURE 6 is a side elevational view, illustrating the support of the carriage unit of FIGURES 2–5 from an overhead rail structure.
Figure 7:
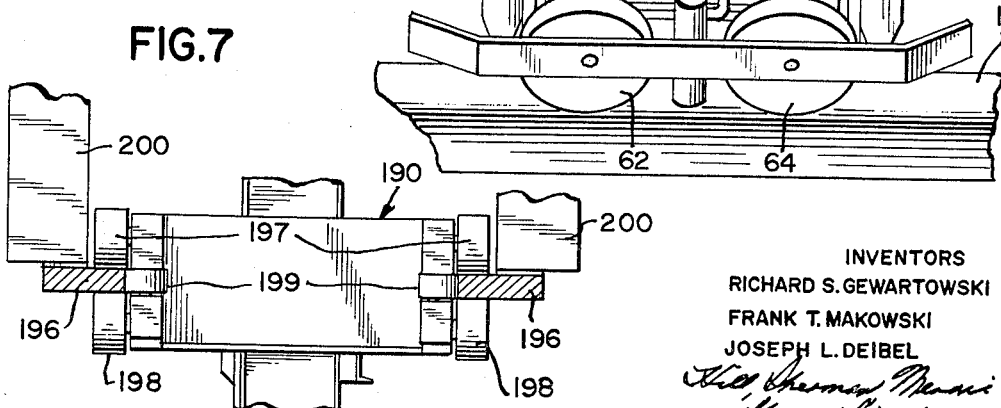
FIGURE 7 is a sectional view taken substantially along line VII—VII of FIGURE 6.

In accordance with this invention, the frame of the carriage 30, thus formed by members 111, 112, 117, 118 and 120–122, is so supported as to permit certain freedoms of movement, including movement about a horizontal axis parallel to the longitudinal axis of the billet 11. Specifically, a special double pivot arrangement is provided which permits the exertion of a downward force urging the wheels 61–64 into firm engagement with a billet, while accommodating twists, bows or the like in the billet. In particular, as shown in FIGURES 2 and 5, a pair of rollers 127 and 128 are journaled on horizontally spaced horizontal axes parallel to the longitudinal axis of the billet and at substantially equal spacings, on opposite sides of a vertical plane through the horizontal axis of the billet, when the carriage is in the neutral position. The rollers 127 and 128 are journaled on shafts 129 and 130 affixed in openings in the plate 122 and in a reinforcing plate 131 secured on the rearward surface of the plate 122. The rollers 127 and 128 are engageable in downwardly-facing generally semi-circular notches 133 and 134 of a plate 135 having a generally V-shaped notch 136 in its upper surface, and referred to as an M plate because of its general configuration.

The M plate 135 is bolted or otherwise secured to a plate 137 which extends downwardly from the rearward end of a longitudinally extending beam 138. An M plate like the plate 135 is carried in a similar fashion at the forward end of the beam 138 and is arranged for engagement with rollers like the rollers 127 and 128 carried at the forward end of the frame of the carriage 30.

In operation, a downward force is applied to the beam 138, in a manner as hereinafter described, and if the surfaces 23 and 24 are at equal 45° angles with respect to a vertical plane, both rollers 127 and 128 are engaged in the notches 133 and 134. If, however, the billet is twisted such that, for example, the surface 23 is at less than a 45° angle with respect to a vertical plane while the surface 24 is at a greater than a 45° angle with respect to a vertical plane, the frame of the carriage is allowed to pivot so that only the roller 128 will be engaged in the notch 134, while the roller 127 will be displaced downwardly out of the notch 133. An opposite action will, of course, take place with a twist of the billet in the opposite direction. It will be observed that with the double pivot action thus obtained, both surfaces 23 and 24 are firmly engaged by the wheels even though the billet is twisted, whereas with a single pivot an action would be obtained wherein the wheels would be lifted from one of the surfaces.

An additional roller 140 is journaled by a shaft 141 carried by the frame plates 131 and 122 in position to engage the sides of the notch 136 to limit pivotal movement of the carriage and also to engage in the notch 136 when the beam 138 is lifted to move the carriage upwardly to an inoperative position.

The longitudinally extending beam 138 is journaled at its center for movement about a horizontal axis transverse to the axis of the billet and is also movable along the axis of pivotal movement. In particular, a central portion of the beam 138 is welded or otherwise secured on a sleeve 142 which is journaled by a sleeve bearing 143 for rotation on a sleeve 144 which is movable axially, but which is restrained against rotation.

In particular, the sleeve 144 is journaled for axial movement on a shaft 145 by means of a bearing 146 which is illustrated as a simple sleeve bearing, but which may preferably be a ball bushing assembly permitting free axial movement with minimum friction. The ends of the shaft 145 are secured to the lower ends of a pair of plates 147 and 148 which are secured at their upper ends to the ends of a beam 150. A pair of flexible bellows members 151 and 152 are provided for shielding the bearing 146 against entry of metal particles or extraneous matter therein.

To prevent rotation of the sleeve 144, a clevis 153 is provided which includes a pair of spaced downwardly extending vertical walls 155 and 156 welded or otherwise secured to the sleeve 144 on opposite sides of the beam 138. A shaft 158 is secured at opposite ends to the plates 147 and 148 and extends through the walls 155 and 156 of the clevis 153, while coiled compression springs 159 and 160 are disposed on the shaft 158 to urge the clevis 153 toward a central neutral position. Suitable adjusting means 161 and 162 may be provided for adjusting the forces exerted by the springs 159 and 166, to thus adjust the neutral position of movement of the sleeve 144 along the axis of the shaft 145.

Adjustable spring means are also provided for urging the beam 138 to a neutral position of pivotal movement about the axis of the shaft 145. In particular, a longitudinally extending bar 164 is provided having a central portion rigidly secured to the portion 156 of the clevis 153 and having angle brackets 165 and 166 at its opposite ends carrying bolts 167 and 168 for engagement with plates 169 and 170 projecting laterally from the beam 138, with coiled compression springs 171 and 172 on the bolts 167 and 168 for urging the bolt heads downwardly against the plates 169 and 170.

To support the beam 150, it is secured at its center to the lower end of a vertical shaft 174 the upper end of which is journaled by suitable thrust bearings 175 and 176 on a horizontal plate 177, plate 177 being secured within a vertically movable frame 178 which includes spaced parallel vertical side members 179 and 180. Thus, the beam 150 is free to rotate about a vertical axis. The rotation is, however, restrained by means of a pair of leaf spring members 181 and 182 secured to the frame members 179 and 180 and having ends engageable with opposite side surfaces of the beam 150 spaced outwardly from the axis of rotation thereof.

To control vertical movement of the frame 178, a horizontal plate 184 therewithin is connected through a coupling 185 to a piston rod 186 connected to a piston movable in a cylinder 187 which is supported from an upwardly extending frame structure 188 on a carrier 190 and which is operated from a suitable source of pressurized fluid, either liquid or air.

The frame 178 is guided for vertical movement by means including pairs of rollers 191 engageable with side surfaces of the frame members 179 and 180, and pairs of rollers 192 engageable with end surfaces of the frame members 179 and 180, the rollers 191 and 192 being journaled on frame members 193 projecting downwardly from the carrier 190.

The carrier 190 is supported for movement along a pair of rails 196 in parallel relation to the billet 11, by means of rollers 197 engageable with upper surfaces of the rails 196, rollers 198 engageable with lower surfaces thereof, and rollers 199 engageable with inner surfaces thereof, rollers 197–199 being journaled on the carrier 190. The rails 196 are supported from the lower ends of a plurality of frame members 200 forming part of an overhead frame structure.

To move the carrier 190 along the rails 196, a chain 201 is entrained on a sprocket wheel 202 and on another sprocket wheel (not shown) at the opposite end of the overhead frame structure and is connected to the carrier 190. As diagrammatically illustrated, the sprocket wheel 202 is driven from an electric motor 203.

After a billet is positioned on the support blocks 18, the fluid-actuated cylinder 187 is automatically operated from the control system 15 to cause the carriage 30 to be lowered and to effect engagement between the wheels 61–64 and the surfaces 23 and 24 of the billet with a certain force, determined by the differential of fluid pressure in the cylinder 187. The motor 203 is then operated from the control system 15 to cause the carriage 30 to automatically move forwardly along the billet to scan the billet for defects. Upon reaching the end of the billet, a signal is developed by a sensing coil 204 which is applied to the control system 15 to cause the carriage 30 to be elevated and to be returned rearwardly to its initial position.

It will be noted that the carriage is fully articulating as required for testing of square or rectangular billets or the like. The rollers 127 and 128 and the M plate 135, and like elements at the forward end of the unit, permit pivotal movement about either of two axes parallel to the longitudinal axis of the billet and on opposite sides of a vertical plane through the longitudinal axis of the billet. Such pivotal movement in combination with the shiftable transverse movement obtained with slidable movement of sleeve 144 on shaft 145, allows the carriage to follow twisted as well as laterally bent or bowed billets. At the same time, a positive downward force may be exerted through a differential in pressure in the cylinder 187 to hold all four wheels in engagement with the billet, without lifting the wheels from one of the surfaces 23 or 24.

Pivotal movement of the beam 138 and sleeve 142 on the sleeve 144 permits the carriage to follow billets which are bent or bowed upwardly or downwardly, and the pivotal movement about a vertical axis, obtained through the support of shaft 174 through the bearings 175 and 176 permits the carriage to follow horizontal bends or turns in the billets. At the same time, the carriage is restrained against forward or rearward movement relative to the carrier 190 to obtain a controlled scanning operation.

It should be emphasized that the invention is not limited to the testing of square or rectangular billets. In the case of round objects, it is not necessary, or desirable, to permit pivotal movement about an axis parallel to the object axis. In that event, a pair of locking bars 205 and 206, which are held in an inoperative position flat against the plates 111 and 112 in testing square billets, are turned 90 degrees to provide a fixed distance between plates 111 and 112 and the lower surface of beam 138 and to engage roller 140 with notch 136 and also engage the corresponding roller and notch at the opposite end.

Referring now to the schematic electrical diagram of FIGURE 8, the transducers 65 are connected through adjustable peaking coils 209 and 210 to the output of a pulser 211 to be energized simultaneously and are also connected to the input of a common amplifier 212 having an output connected to a gate circuit 213. The gate circuit 213 is operated from timing circuits 214 which also control the pulser. Preferably, the gate circuit 213 may be enabled during time intervals corresponding to the reception of echoes back from a central portion of the billet. With this arrangement, echoes may be received by one transducer in response to pulses transmitted by the other, as by flaws lying at angles on the order of 45° relative to the axes of transmission. As a result it is possible to obtain a substantial response to virtually all flaws regardless of orientation.

It is also possible to operate gate circuit 213, or a separate gate circuit, at intervals corresponding to reflections from the back surfaces of the billet.

As diagrammatically illustrated, the recorder 51 may use a paper web or sheet 215 movable from a supply roll 216 over rolls 218-223 to a take-up roll 224 at least certain of the rolls being driven by a drive control 225 which is controlled from the control system 15 to synchronize the movement of the web 215 with the testing operations. A recording pen 226 may be energized from the output of the gate circuit to indicate amplitude variations on the paper 215. A second pen 227 may be energized from the output of a threshold circuit 228 connected to the output of the gate circuit 213, to produce marks in response to echo signals above a predetermined amplitude.

As also illustrated diagrammatically, a window 230 is provided to expose a portion of the web 215 spaced a substantial distance from the recording pens 226 and 227. The distance is so related to the speed of drive of the web and the speed of the testing operations such that the test results viewed through the window 230 correspond to those obtained from the object which is then at the inspection position.

It will be understood that modifications and variations may be effected without departing from the spirit and scope of the novel concepts of this invention.

We claim as our invention:

1. In apparatus for testing an object, means for receiving the object, means for shifting the object from said receiving means to an ultrasonic test position, carriage means movable along the object at said ultrasonic test position, ultrasonic probe means on said carriage means for scanning the object, means for shifting the object from said ultrasonic test position to a magnetic processing position, means for applying magnetic particles over the object in said magnetic processing position, means for shifting the object from said magnetic processing position to an inspection position, means for shifting the object out of said inspection position, a control system for operating said shifting means in timed relation for cyclic feeding of a series of objects through the apparatus, means for recording the results of said ultrasonic scanning, and means for presenting the recorded results of the ultrasonic testing of each object adjacent said inspection position simultaneously with the placement of the same object at said inspection position.

2. In apparatus for testing an object, means for receiving the object, means for shifting the object from said receiving means to an ultrasonic test position, carriage means movable along the object at said ultrasonic test position, ultrasonic probe means on said carriage means for scanning the object, means for shifting the object from said ultrasonic test position to a magnetic processing position, means for applying magnetic particles over the object in said magnetic processing position, means for shifting the object from said magnetic processing position to an inspection position, a control system for operating said shifting means in timed relation for cyclic feeding of a series of objects through the apparatus, means for supporting a web of sheet material, means for driving said web in timed relation to the shifting of said objects, and means for recording the results of said ultrasonic scanning on said web, the length of said web and the driving speed thereof being such that the portion of the web having recorded thereon the results of the ultrasonic testing of the object is presented at said inspection station at the same time as the corresponding test object.

3. In a system for ultrasonic testing of an elongated object having a pair of generally planar side surfaces meeting at an edge extending longitudinally of the object, a carriage including a pair of wheels respectively engageable with said side surfaces, a carrier movable generally parallel to the longitudinal axis of the object, probe means on said carriage for scanning movement along at least one of said side surfaces, support means supported on said carrier for movement generally along a first axis intersecting said edge and bisecting the angle between said planar surfaces and along a second axis transverse to both said first axis and the longitudinal axis of the object, and connection means on said support means and said carriage for permitting pivotal movement of said carriage selectively about either of two axes parallel to the longitudinal axis of the object and on opposite sides of a plane through said first axis and the longitudinal axis of the object.

4. In a system as defined in claim 3, said connection means comprising pivot means disposed on said carriage and cooperating pivot means disposed on said support means, one of said pivot means having a pair of transversely spaced notches therein and the other of said pivot means having projecting portions engageable in said notches.

5. In a system as defined in claim 3, said wheels having rigid cylindrical surfaces engageable with said side surfaces with said probe means being supported on said carriage in fixed relation to the axes of said wheels.

6. In a system as defined in claim 3, said carriage including a second pair of wheels respectively engageable with said side surfaces and having axes in spaced parallel relation to the axes of the first pair of wheels.

7. In a system as defined in claim 6, said wheels having rigid cylindrical surfaces engageable with said side surfaces with said probe means being supported on said carriage in fixed relation to the axes of said wheels.

8. In a system for ultrasonic testing of an elongated object of generally rectangular cross-section having a pair of generally planar side surfaces meeting at an edge extending longitudinally of the object, a pair of ultrasonic probe means for translating ultrasonic waves along axes respectively generally normal to said pair of generally planar side surfaces, a carriage supporting said probe means and including a pair of wheels each having a rigid cylindrical surface having a substantial axial dimension, a pair of bearing means on said carriage journalling said wheels for rotation about a pair of axes generally transverse to each other and in fixed relation to said axes of said probe means, and support means supporting said object and said carriage for effecting relative movement of said carriage along the object, said support means including connection means arranged to urge said rigid cylindrical surfaces of said wheels into pressure engagement with said generally planar side surfaces of said object while allowing limited freedom of movement thereof to maintain fixed angles between said axes of said probe means and said planar side surfaces of said object irrespective of twists and bends in said planar surfaces of said object.

9. In a system as defined in claim 8, said carriage including a second pair of wheels each having a rigid cylindrical surface having a substantial axial dimension, a second pair of bearing means on said carriage journalling said second pair of wheels for rotation about axes generally transverse to each other and in fixed relation to said axes of said probe means, said pair of axes of rotation of said second pair of wheels being in spaced parallel relation to said pair of axes of the first pair of wheels, said probe means being located between said first and second pairs of wheels, and said connection means being arranged to also urge said rigid cylindrical surfaces of said second pair of wheels into pressure engagement with said generally planar side surfaces.

References Cited

UNITED STATES PATENTS

| | | | |
|---|---|---|---|
| 2,852,707 | 9/1958 | Kaehms | 73—67.8 XR |
| 2,951,365 | 9/1960 | Legrand | 73—67.8 |
| 2,969,671 | 1/1961 | Sproule | 73—67.9 |
| 2,990,512 | 6/1961 | Gewartowski et al. | 324—38 |
| 3,182,490 | 5/1965 | Gibson | 73—67.8 |
| 3,323,354 | 6/1967 | Daubresse et al. | 73—67.8 |
| 3,327,523 | 6/1967 | Kelemencky et al. | 73—71.5 |
| 3,350,925 | 11/1967 | Coy | 73—71.5 |

FOREIGN PATENTS

| | | |
|---|---|---|
| 1,096,076 | 12/1960 | Germany. |
| 157,551 | 12/1963 | U.S.S.R. |

RICHARD C. QUEISSER, Primary Examiner

JOHN P. BEAUCHAMP, Assistant Examiner

U.S. Cl. X.R.

73—71.5; 324—68